United States Patent [19]

Steckle, Jr. et al.

[11] Patent Number: 5,629,353
[45] Date of Patent: May 13, 1997

[54] HIGHLY CROSS-LINKED NANOPOROUS POLYMERS

[75] Inventors: Warren P. Steckle, Jr.; Paul G. Apen; Michael A. Mitchell, all of Los Alamos, N.M.

[73] Assignee: The Regents of the University of California, Oakland, Calif.

[21] Appl. No.: 447,139

[22] Filed: May 22, 1995

[51] Int. Cl.$^6$ .................................. C08J 9/00; C08J 9/28
[52] U.S. Cl. ........................... 521/64; 264/50; 521/61; 521/82; 521/97; 521/146; 521/147; 521/149; 521/150
[58] Field of Search ................... 521/61, 64, 146, 521/147, 149, 150, 82, 97; 264/50

[56] References Cited

U.S. PATENT DOCUMENTS

| | | | |
|---|---|---|---|
| 3,322,695 | 5/1967 | Alfrey, Jr. et al. | 260/2.5 |
| 3,767,600 | 10/1973 | Albright | 260/2.2 R |
| 3,969,325 | 7/1976 | Conciatori et al. | 260/78.41 |
| 4,224,415 | 9/1980 | Meltzaer et al. | 521/38 |
| 4,667,417 | 5/1987 | Graser et al. | 34/9 |
| 4,806,246 | 2/1989 | Nomura | 210/651 |
| 4,857,630 | 8/1989 | Kim | 528/397 |
| 4,987,157 | 1/1991 | Smart et al. | 521/50 |
| 5,049,328 | 9/1991 | Meyer et al. | 264/50 |
| 5,066,684 | 11/1991 | LeMay | 521/64 |
| 5,069,945 | 12/1991 | Wrasidlo | 427/245 |
| 5,081,163 | 1/1992 | Pekala | 521/187 |
| 5,116,883 | 5/1992 | LeMay | 521/178 |
| 5,158,986 | 10/1992 | Cha et al. | 521/82 |
| 5,334,356 | 8/1994 | Baldwin et al. | 422/133 |

OTHER PUBLICATIONS

M. P. Tsyurupa et al., "Intramolecularly Crosslinked Polystyrene As Model Of A Supercrosslinked Network," 12 Polymer Science, vol. 33, pp. 2497–2503 (1991).

V. A. Davankov et al., "Structure And Properties Of Hypercrosslinked Polystyrene—The First Representative Of A New Class Of Polymer Networks," 13 Reactive Polymers, pp. 27–42 (1990).

L. D. Belyakova et al., "Sorption Of Vapors Of Various Substances By Hypercrosslinked Styrosorb Polystyrenes," 25 Advances in Colloid and Interface Science, pp. 249–266 (1986).

N. Grassie et al., "Friedel–Crafts Polymers—I. Formation And Stability Of Polymers Containing Heterocycles," European Polymer Journal, vol. 4, pp. 571–580 (1968).

*Primary Examiner*—Morton Foelak
*Attorney, Agent, or Firm*—Gemma Morrison Bennett

[57] ABSTRACT

Condensation polymerization followed by a supercritical extraction step can be used to obtain highly cross-linked nanoporous polymers with high surface area, controlled pore sizes and rigid structural integrity. The invention polymers are useful for applications requiring separation membranes.

5 Claims, 1 Drawing Sheet

5,629,353

HIGHLY CROSS-LINKED NANOPOROUS POLYMERS

TECHNICAL FIELD

This invention relates to cross-linked nanoporous polymers and methods for making cross-linked nanoporous polymers. This invention was made with government support under Contract No. W-7405-ENG-36 awarded by the U.S. Department of Energy. The government has certain rights in the invention.

BACKGROUND ART

There have been developed various porous materials for use in industry and government for chemical separations, processing and monitoring, environmental cleanup and remediation, energy efficiency and conservation. Porous materials used in these applications include foams, filters, membranes, absorbents, ion exchange resins, molecular sieves, zeolites, catalyst supports, sensors and electrodes. Polymeric foams have found limited use in several of the above-mentioned applications because of the difficulty of controlling foam morphology at the sub-micron level using conventional foam producing techniques.

Efforts have been made to control porosity in rigid-rod hypercross-linked polymers at the nanometer level using low temperature condensation reactions or sol-gel processing techniques. While some successes are noted, the starting materials can be expensive or difficult to synthesize and the cross-linking reactions are cumbersome and not amenable to large scale preparations.

Highly cross-linked polystyrenes with extraordinarily high surface areas which have a high enough density of rigid cross-linking to prevent polymeric network collapse have been developed. Although these polystyrenes swell in thermodynamically unfavorable solvents, absorb dyes and hydrocarbons, and readily absorb gases, these polystyrenes are in some ways not the best materials for separation technologies. The nanostructures of these highly cross-linked polystyrenes cannot easily be varied since the pore sizes and volumes are determined for the most part by the length and structure of the cross-linking agent. The flexible backbone of the polystyrene starting material requires that rigid cross-linking agents be employed in order to obtain true nanoporosity in the bulk material, thus limiting choices of design and properties. These hypercross-linked polystyrenes possess high glass transition temperatures and high decomposition temperatures. These undesirable characteristics prevent use of the polymers in harsh environments.

There is still a need for easily tailorable, nanoporous, rigid, hypercross-linked polymeric materials. There is a need for such polymeric materials which can be made simply from relatively inexpensive starting materials.

DISCLOSURE OF INVENTION

It is an object of this invention to provide rigid, highly cross-linked nanoporous polymers.

It is another object of this invention to provide polymeric materials suitable as separation membranes.

It is a further object of this invention to provide methods of making rigid, highly cross-linked nanoporous polymers.

It is yet another object of this invention to provide methods of making polymeric materials suitable as separation membranes.

To achieve the foregoing and other objects, and in accordance with the purposes of the present invention, there has been invented a cross-linked nanoporous polymer comprising:

(a) repeating units of at least one aromatic monomer; and
(b) at least one cross-linking agent.

In accordance with another embodiment of this invention, there is provided a process for preparing a cross-linked nanoporous polymer comprising:

(a) combining under polymerization conditions at least one aromatic monomer and at least one cross-linking agent chosen from the group of multifunctional acyl halides and benzylic halides.
(b) allowing polymerization to occur until a copolymer gel is formed;
(c) removing catalysts and unreacted monomers from said copolymer gel;
(d) adding a supercritical extraction agent to said copolymer gel; and
(e) removing said supercritical extraction agent under supercritical conditions.

BEST MODES FOR CARRYING OUT THE INVENTION

Figure 1:
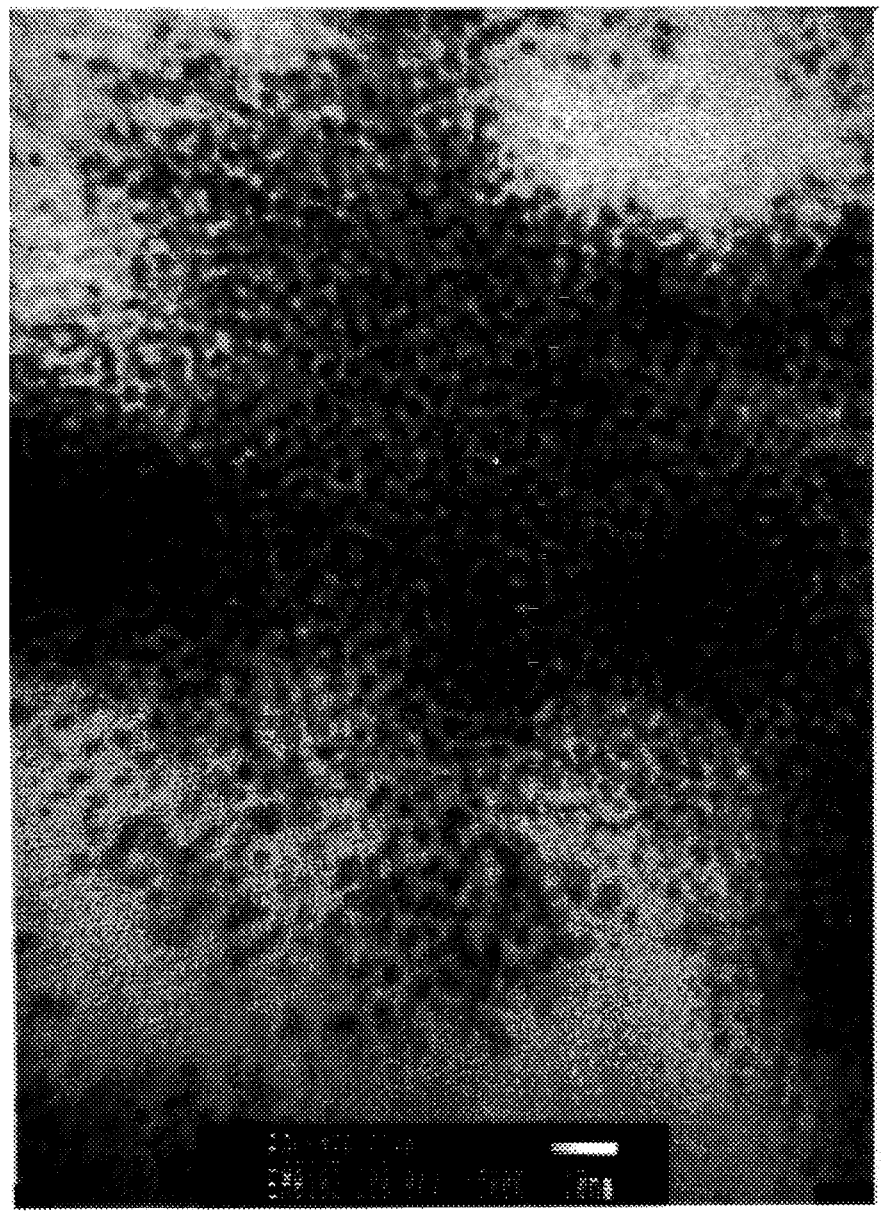
FIG. 1 is a transmission electron micrograph of an invention polymer.

It has been discovered that condensation copolymerization of aromatic monomers and cross-linking agents followed by a supercritical extraction step can be employed to obtain nanoporous thermosetting copolymers with structural integrity useful for applications such as separation membranes.

Monomers useful in the invention are aromatic hydrocarbons and certain quasi-aromatic compounds which include, but are not limited to, benzene, biphenyl, diphenylmethane, 1,3,5-triphenylbenzene, m-terphenyl, bibenzyl), pyrene, napthalene, anthracene, triphenylene, tetraphenylmethane, triptycene; and macromonomers based on 2,6-dimethlyphenylene oxide, styrene, methylphenyl siloxane and mixtures of styrene with polymerizable alkenes. Examples of quas-aromatic compounds which can be polymerized with the cross-linking agents of this invention include, but are not limited to, carborane and metallocenes.

Cross-linking agents useful in the invention include other monomers which will react in such a manner as to connect the polymer chains of the chosen monomer so as to form a multiplicity of small pores or cells in the polymerization product. Suitable cross-linking agents include, but are not limited to, ortho-, recta- and para-dichloroxylene, also denoted as bis(chloromethyl)xylene and chloromethylstyrene, 4,4'-dichloromethylbiphenyl and terephthaloyl chloride.

Use of too little cross-linking agent will result in open cell sizes which are too large for the successful application of the invention polymers as separation membranes for gases, absorbants, or catalyst supports. Use of too much cross-linking agent will result in failure of the complete incorporation of all monomers and cross-linking agents into the gel. Generally, polymerizations with appropriate amounts of reactants are quantitative.

Relative amounts of cross-linking agent or agents and monomer or monomers employed in the practice of the invention will depend upon the choice of monomers, cross-linking agents and reaction time. Generally useful amounts are shown in Table 1.

TABLE 1

Amounts of Polymers and Cross-linking Agents Useful in the
Invention Cross-linked Nanoporous Polymers

|  | Broad Range, wt. % | Preferred Range, wt. % |
| --- | --- | --- |
| Monomer | 2–90 | 30–50 |
| Cross-linking agent | 10–98 | 50–70 |

Supercritical extraction agents useful in the invention include any gas or liquid which can displace the solvent in the gel. Presently preferred is liquid carbon dioxide because it is inexpensive, non-flamable, non-toxic, and is readily available commercially. The amount of supercritical fluid used in the supercritical extraction step must be adequate for replacement of all of the solvent in the polymer cells and to fill all the pores of the polymer gel. Use of an insufficient amount of the supercritical fluid would result in the incomplete removal of the extraction solvent resulting in the collapse of the open-cell porous structure of the polymer.

Many of the monomers and cross-linking agents which can be employed in this invention are readily and economically available, and do not have to be of double-distilled quality or rigorously purified.

The cross-linked nanoporous polymers of the invention can be made using Friedel-Crafts type polycondensation reactions. One or more monomers and cross-linking agents are combined in a suitable solvent. Suitable solvents include such liquids as dichloroethane, and dichloromethane. Other solvents known in the art may also be used successfully. The amount of solvent generally presently preferred is in the range of about 80 to 90 weight percent, but generally range from about 60 to 98 weight percent based on total weight of monomer and cross-linking agent, Polymerization occurs in the presence of any of catalysts known in the art as being suitable catalysts for Friedel-Crafts type reactions. These include, but are not limited to, the following Lewis acids: tin tetrachloride, boron trifluoride and aluminum trichloride.

An amount of initiator sufficient to catalyze substantially complete polymerization of the monomers is used. Use of too little initiator will result in incomplete polymerization of the monomer or monomers and cross-linking agent or agents and result in monomer residue in the polymer gels. Use of too much initiator is not economically feasible, will result in the presence of undesirable catalyst residue in the polymeric gels, and may cause formation of cracks in the final product.

The polymerization can be carded out at room temperature and ambient pressures. However, when it is desirable to increase the speed of the reaction or to minimize the amount of catalyst needed to carry the reaction to completion, the temperature may be increased to just under the boiling point of the reaction solvent.

Polymerization is allowed to continue until as much of the monomer and cross-linking agent is reacted as desired. Generally this will be as much of monomer and cross-linking agent as efficiency of the reaction permits because of the subsequent need for removing unreacted materials and for economic reasons. For the generally presently preferred choices of monomers and cross-linking agents of this invention, the reaction time will depend upon choice of monomers, catalyst, solvent, solution concentration and reaction temperature.

The condensation polymerization product will be a gel copolymer of the monomer or monomers and cross-linking agent or agents.

The recovered copolymer gels can be cleaned of catalyst residue or other unreacted materials using any appropriate solvent. Generally presently preferred for the washes are solvents such as acetone, alcohols such as methanol, ethanol and propanol, and tetrahydrofuran. Other washes known in the art may be used. One or more washes are used depending upon the amount and nature of the material being removed.

The cleaning wash solvent can be pumped through the porous polymers in glass or synthetic containers of various sorts. Radial compression or axial compression columns or shrink columns can be used to prevent streaming of the cleaning solvent around the outsides of the copolymer gel clumps.

Alternatively, the polymers may be cleaned by simply agitating the copolymer gel in a container of the solvent for a period of time sufficient for the solvent to soak into all of the open cells of the copolymer gel.

Drying of the polymer gel is accomplished by critical point extraction.

The washed gels are then subjected to a supercritical extraction step in which critical point drying is accomplished in a pressure vessel. A suitable liquid phase of a normally gaseous compound such as carbon dioxide is introduced into the pressure vessel containing the copolymer gel. The supercritical fluid is introduced under enough pressure to push it into the pores of the copolymer gel but not so much pressure as to break down the open cell structure in the polymer gel.

The solvent is driven from the open-cell nanopores of the cross-linked copolymer by positive pressure of the supercritical fluid entering the nanoporous network and/or more slowly by the action of gravity causing the solvent to drain downward from the copolymer.

As the supercritical fluid is being applied to the copolymer, the system is slowly warmed up to the critical point of the supercritical fluid. The pressure of the system is maintained at a constant level by slowly releasing the gaseous phase which is forming from the supercritical fluid as it is warmed. It is believed that the cautious (timewise) replacement of the solvent in the open-cell nanopores of the cross-linked copolymer with the supercritical fluid avoids crushing structural destruction of the nanopores as would occur if the supercritical fluid were permitted to convert quickly to a gaseous phase and rapidly released. This is the critical point drying concept.

The polymers produced in accordance with this invention are open-celled porous cross-linked linked thermosetting copolymers with cell sizes ranging from less than one-half to well over two hundred nanometers. Generally, the most useful copolymers produced in accordance with this invention have cell sizes in the range from about 0.4 nanometers to about 20 nanometers for most separation membrane applications.

One of the advantages of the invention polymers is the suitability of the polymers for separation of hydrocarbons by size. In order to separate a variety of different substances, materials with different pore sizes will be needed depending on the application. An advantage of this invention is that by choice of monomers, cross-linking agents, amounts and processing conditions, the invention polymer can be custom tailored to the specific application needs for pore size and surface area.

The open cells or pores are arranged such that a three-dimensional sponge-like network is formed. The porosities of the invention polymers can exceed 80%, and are generally in the range of 50% to 70%. A typical transmission electron micrograph of a bibenzyl copolymer produced in accordance with this invention is shown in FIG. 1. The scale bar at the left of the micrograph is 10 nanometers.

The average cell size of the polymers can be altered by the choice of monomer or monomers, cross-linking agent or agents and the method of preparation. Depending upon the intended application, different degrees of porosity, pore size, density, or degree of interconnectedness of the cells in the copolymers may be desired. These can be controlled by choice of monomer or monomers and/or cross-linking agent or agents.

The highly cross-linked nanoporous polymers of this invention have high surface areas in proportion to the overall dimensions of the polymer because of the large numbers of and smallness of the open cells or pores in the polymeric structure. The invention polymers are thermosetting, rigid structures that do not crumble easily and can be described as monolithic, hard and brittle. The polymers of this invention have the structural integrity necessary for use as separation membranes; i.e., they are generally free of cracks and large voids and do not crumble easily. These properties are important for materials to be used in separation applications. Separation membranes made of the polymers of this invention can be made in various shapes including wafers, cylinders or sheets and are machinable.

An important advantage of the polymers of this invention is that the pore sizes of the polymers can be controlled and the polymers can be machined into any geometry, thus rendering them utilitarian for a great variety of uses.

The following examples will demonstrate the operability of the invention.

EXAMPLE I

A solution of 1 part benzene and 3.35 parts p-dichloroxylene in 21.7 parts dichloroethane was prepared in a vial. Then 1.24 parts tin (IV) chloride as a catalyst was charged to the vial. Upon the addition of the catalyst a yellow tinge appeared in the otherwise clear solution.

The vial containing the solution was placed in a 55° C. oven for a period of 12 to 16 hours. As time passed, evolution of HCl was observed, indicating that the Friedel-Crafts condensation reaction was occurring. The color of the reaction product darkened throughout the course of the reaction period to a dark red color.

The resulting polymer gel was removed from the reaction vial and washed 4 times with 54 parts acetone each wash to remove any unreacted monomers and catalyst. The dark red color of the reaction product went away, leaving a beige polymer gel.

The beige polymer gel was placed in a Polaron™ extractor for supercritical extraction with carbon dioxide. Liquid carbon dioxide was charged into the gel at 10° C. under 800 psi pressure. Acetone solvent was removed from the system through a drain.

After 12 hours the Polaron™ extractor was heated to 40° C. while not allowing the pressure to exceed 1500 psi. (This temperature was above the critical point temperature for the carbon dioxide.) The pressure was maintained by venting of the carbon dioxide. After the Polaron™ extractor reached 40° C., the carbon dioxide was allowed to bleed off, leaving the treated polymer product.

The resulting polymer product was porous and open-celled, with a surface area of 690 m²/g. Pores of a multiplicity of size scales were observed. The resulting polymer had nanopores with an average size of 0.0006 microns (visually observed using Transmission Electron Microscopy and measured by nitrogen adsorption). The resulting polymer had micropores with an average size of 0.0156 microns (observed using Scanning Electron Microscopy and measured by nitrogen adsorption). The polymer product was a rigid structure in the shape of the mold in which the polymerization was carded out and had a density of 0.5 g/cc. Elemental analysis of the polymer showed that there was no residual tin in the polymer.

EXAMPLE II

Condensation polymerizations were made of several other monomers using dichloroxylene as the cross-linking agent, tin (IV) chloride as the catalyst, and dichloroethane as the solvent to demonstrate operability of invention polymers using other monomers and different ratios of amounts of polymer to cross-linking agent. The same method described in Example I was used to copolymerize the monomers and cross-linking agents shown in Runs 1–12 in Table 2 using the amounts of monomer and cross-linking agent shown in Table 2.

TABLE 2

| Run | Monomer | Wt. % Monomer | Cross-Linking Agent | Wt. % Cross-Linking Agent |
|---|---|---|---|---|
| 1 | Bibenzyl | 41.0 | Dichloroxylene | 59.0 |
| 2 | Biphenyl | 37.0 | Dichloroxylene | 63.0 |
| 3 | Diphenylmethane | 39.0 | Dichloroxylene | 61.0 |
| 4 | Triphenylbenzene | 53.9 | Dichloroxylene | 46.1 |
| 5 | Diphenylmethane | 32.5 | Dichloroxylene | 67.5 |
| 6 | Biphenyl | 33.7 | Dichloroxylene | 66.3 |
| 7 | Biphenyl | 30.6 | Dichloroxylene | 69.4 |
| 8 | Triphenylbenzene | 44.6 | Dichloroxylene | 55.4 |
| 9 | Benzene | 22.9 | Dichloroxylene | 77.1 |
| 10 | Polystyrene[a] | 28.3 | Dichloroxylene | 71.7 |
| 11 | Polystyrene[b] | 23.0 | Dichloroxylene | 77.0 |
| 12 | Polystyrene[c] | 23.0 | Dichloroxylene | 77.0 |

[a]M. Wt. 50,000 Daltons
[b]M. Wt. 280,000 Daltons
[c]M. Wt. 50,000 Daltons

The polymer gels of these runs were purple/maroon in color before the supercritical fluid extraction and were pink/lavender in color after the extraction step.

Sample coupons approximately 1 to 5 cm in diameter and 0.1 to 10 cm in thickness were made from the polymer produced in each of the test runs. The coupons were machined into wafers. Surface area analysis of each of the wafers was performed by nitrogen adsorption techniques using a Micromeritics™ ASAP 2010 surface area analyzer. The wafers were also tested using the tests described in U.S. Pat. No. 4,987,157, column 3, lines 26 through 52, incorporated herein by reference.

Table 3 shows properties of the polymers made in these runs.

TABLE 3

| Run | Cross-Linking Agent to Monomer Ratio[a] | BET Surface Area, m²/g | Horvath-Kawazoe Micropore, Angstroms | Dubinin Mean Pore Size, Angstroms | BJH Pore Size Angstroms |
|---|---|---|---|---|---|
| 1 | 1.49 | 159.9 | 7.1 | 25.2 | 215.5 |
| 2 | 1.50 | 291.5 | 6.7 | 24.2 | 211.8 |

TABLE 3-continued

| Run | Cross-Linking Agent to Monomer Ratio[a] | BET Surface Area, m²/g | Horvath-Kawazoe Micropore, Angstroms | Dubinin Mean Pore Size, Angstroms | BJH Pore Size Angstroms |
| --- | --- | --- | --- | --- | --- |
| 3 | 1.50 | 291.9 | 10.1 | 25.5 | 259.9 |
| 4 | 1.50 | 311.4 | 6.6 | 24.4 | 122.6 |
| 5 | 1.95 | 370.2 | 6.6 | 23.6 | 144.6 |
| 6 | 1.74 | 570.6 | 7.4 | 23.0 | 153.9 |
| 7 | 2.00 | 603.3 | 7.2 | 21.3 | 125.0 |
| 8 | 2.01 | 636.2 | 6.8 | 22.0 | 112.4 |
| 9 | 1.50 | 692.1 | 6.2 | 21.5 | 155.7 |
| 10 | 1.50 | 994.8 | 6.2 | 22.2 | 128.6 |
| 11 | 2.00 | 1,096.0 | 6.5 | 23.6 | 148.3 |
| 12 | 2.00 | 1,204.4 | 6.0 | 21.3 | 105.8 |

[a]Molar ratio.

EXAMPLE III

Two more runs were made for the purpose of comparing an invention copolymer with a copolymer of the same monomer and cross-linking agent in the same ratio of amounts. The comparison copolymer was made in exactly the same manner as the invention copolymer in this pair of runs. Both the comparison copolymer and the invention copolymer of this run were made according to the method described in Example I with the exceptions that one sample was air dried with the supercritical fluid treatment step omitted and the other was dried using the critical point drying method described herein.

The invention polymer and the comparison polymer were tested. Properties of the invention polymer of this run and of the comparison polymer are shown in Runs 13 and 14 in Table 4 below.

TABLE 4

| Run | Cross-Linking Agent to Monomer Ratio | BET Surface Area, m²/g | BJH Pore Diameter, Angstroms | Dubinin Pore Diameter, Angstroms |
| --- | --- | --- | --- | --- |
| 13[a] | 1:1.49 | 159.9 | 215.5 | 25.2 |
| 14[b] | 1:1.49 | 1.12 | 112.7 | 24.8 |

[a]Run 13 is Run 1 shown in Table 2 repeated here for ease of comparison.
[b]Run 14 is a comparison Run.

The results of these two runs demonstrate that without the unique combination of steps in the preparation of the invention polymers, polymers of the same materials would not have the same open-cell nanoporous structure with large surface area as the invention polymers. The comparison polymers could not be used for the separation applications because the comparison polymers lack the novel porous structure of the invention polymers.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

INDUSTRIAL APPLICABILITY

The rigid, highly cross-linked nanoporous polymers of this invention can be used for chemical separations, processing and monitoring and for environmental cleanup and remediation applications.

What is claimed is:

1. A process for preparing a cross-linked nanoporous polymer comprising:

(a) combining under polymerization conditions at least one aromatic monomer and a cross-linking agent chosen from the group of multifunctional acyl halides and benzylic halides.

(b) allowing polymerization to occur until a copolymer gel is formed;

(c) removing catalysts and unreacted monomers from said copolymer gel;

(d) adding liquid carbon dioxide to said copolymer gel;

(e) removing said liquid carbon dioxide under supercritical conditions.

2. The process as recited in claim 1 wherein said at least one aromatic monomer is one chosen from the group of benzene, biphenyl, diphenylmethane, 1,3,5-triphenylbenzene, m-terphenyl, terphenyl, bibenzyl, pyrene, napthalene, anthracene, triphenylene, tetraphenylmethane, triptycene; and macromonomers based on 2,6-dimethylphenylene oxide, styrene, methylphenyl siloxane; and mixtures of styrene with polymerizable alkenes; carborane and metallocenes and said at least one cross-linking agent is one chosen from the group of ortho-, meta- and para-dichloroxylene, and chloromethylstyrene, 4,4'-dichloromethylbiphenyl and terephthaloyl chloride.

3. The process as recited in claim 1 wherein said at least one aromatic monomer is one chosen from the group of styrene, bibenzyl, biphenyl, diphenylmethane, triphenylbenzene, diphenylmethane and benzene.

4. The process as recited in claim 1 wherein said at least one aromatic monomer is styrene.

5. The process as recited in claim 1 wherein said at least one cross-linking agent is dichloroxylene.

* * * * *